United States Patent [19]

Kipphan et al.

[11] Patent Number: 5,141,323
[45] Date of Patent: Aug. 25, 1992

[54] COLOR MEASUREMENT SYSTEM

[75] Inventors: Helmut Kipphan, Schwetzingen; Gerhard Löffler, Walldorf, both of Fed. Rep. of Germany

[73] Assignee: Heidelberger Druckmaschinen AG, Heidelberg, Fed. Rep. of Germany

[21] Appl. No.: 405,638

[22] Filed: Sep. 11, 1989

[30] Foreign Application Priority Data

Sep. 9, 1988 [DE] Fed. Rep. of Germany ....... 3830731

[51] Int. Cl.⁵ .................... G01N 21/25; G01J 3/51
[52] U.S. Cl. .................... 356/406; 356/407; 356/419
[58] Field of Search ............ 356/405, 406, 407, 408, 356/416, 419, 73, 402, 425; 364/526; 101/211; 250/226

[56] References Cited

U.S. PATENT DOCUMENTS

| 4,003,660 | 1/1977 | Christie, Jr. et al. |
| 4,019,819 | 4/1977 | Lodzinski ............ 356/405 |
| 4,505,589 | 3/1985 | Ott et al. ............ 356/402 |
| 4,773,761 | 9/1988 | Sugiyama et al. ..... 356/405 |
| 4,967,379 | 10/1990 | Ott ................. 364/526 |

FOREIGN PATENT DOCUMENTS

| 207304 | 3/1957 | Australia. |
| 209142 | 7/1957 | Australia. |
| 0064024 | 11/1982 | European Pat. Off. . |
| 0065484 | 11/1982 | European Pat. Off. . |
| 0011376 | 10/1983 | European Pat. Off. . |
| 0136542 | 4/1985 | European Pat. Off. . |
| 0228347 | 12/1986 | European Pat. Off. . |
| 2731842 | 1/1979 | Fed. Rep. of Germany . |
| 3406175 | 8/1985 | Fed. Rep. of Germany . |
| 3642922 | 6/1987 | Fed. Rep. of Germany . |
| 3626423 | 2/1988 | Fed. Rep. of Germany . |
| 2071573A | 2/1981 | United Kingdom . |

OTHER PUBLICATIONS

Patent Abstracts of Japan, vol. 13, No. 271, (P-889), Jun. 22, 1989 & JP-A-01 063824, (Fuji Photo Film Co. Ltd.), Mar. 9, 1989.
DIN 5033, Parts 4 and 6, Aug. 1976; mentioned on pages 1 and 2 of Specification.

Primary Examiner—F. L. Evans
Assistant Examiner—K. P. Hantis
Attorney, Agent, or Firm—Herbert L. Lerner; Laurence A. Greenberg

[57] ABSTRACT

Color measurement system for offset printing, having a bridge for spanning an original which is to be measured and a color-measuring device movably disposed on the bridge, the color-measuring device comprising a first three-color simultaneous measuring head for densitometric measurement, and a second three-color simultaneous measuring head for colorimetric measurement.

2 Claims, 6 Drawing Sheets

COLOR MEASUREMENT SYSTEM

BACKGROUND OF THE INVENTION

The invention relates to a color measurement system for offset printing, with a color-measuring device movably disposed on a bridge which spans an original to be measured.

Various color-measuring processes are known for the measurement of color-measuring fields of a print quality control strip, the color-measuring fields being printed together with the printed image on a printed sheet. The most comprehensive color measurement process is the spectral process, for example, in accordance with German Industrial Standard (DIN) 5033, Part 4 wherein, within a prescribed wavelength band of 380 nm to 780 nm, 20 to 80 measured values, depending upon accuracy requirements, are obtained for each measuring field. Both the required color coordinates for the selected color space and the necessary colorimetric purities may be arithmetically determined from the thus measured spectral curve by evaluation with color-matching curves and by evaluation with selected color-filter curves. The spectral process entails considerable expense, however. On the one hand, the required division into the individual wavelength bands is costly. On the other hand, it is necessary to carry out extensive processing of the data derived from the measurement. Relatively inexpensive measuring processes and devices have become known heretofore for the determination of colorimetric purities. Moreover, relatively simple devices have become known heretofore for the so-called tristimulus process, in which values for each of three color coordinates are measured according to color-matching curves, for example according to German Industrial Standard (DIN) 5033, Part 6.

SUMMARY OF THE INVENTION

Starting from this state of the Art, it is accordingly an object of the invention to provide a color measurement system which determines the required values for the alternative or selective performance of color-control processes according to colorimetric coordinates and/or colorimetric purities in a very economical and very rapid manner.

With the foregoing and other objects in view, there is provided, in accordance with the invention, a color measurement system for offset printing, having a bridge for spanning an original which is to be measured and a color-measuring device movably disposed on the bridge, the color-measuring device comprising a first three-color simultaneous measuring head for densitometric measurement, and a second three-color simultaneous measuring head for colorimetric measurement. This improvement over the state of the Art has the advantage that basically conventional color measuring heads may be used therewith.

In accordance with an alternate aspect of the invention, there is provided a color measurement system for offset printing having a bridge for spanning an original which is to be measured, and a color-measuring device movably disposed on the bridge, the color-measuring device comprising a simultaneous measuring head with six optoelectric receivers, and three color filters for densitometric measurement and three color filters for colorimetric measurement, all of the filters, respectively, being disposed in optical paths of the six optoelectric receivers This improvement over the state of the Art represents a marked simplification in the construction of the system and device according to the invention.

Although the invention is illustrated and described herein as embodied in a color measurement system, it is nevertheless not intended to be limited to the details shown, since various modifications and structural changes may be made therein without departing from the spirit of the invention and within the scope and range of equivalents of the claims.

BRIEF DESCRIPTION OF THE INVENTION

The construction and method of operation of the invention, however, together with additional objects and advantages thereof will be best understood from the following description of specific embodiments when read in connection with the accompanying drawings, in which.

DESCRIPTION OF PREFERRED EMBODIMENTS

Figure 1A:
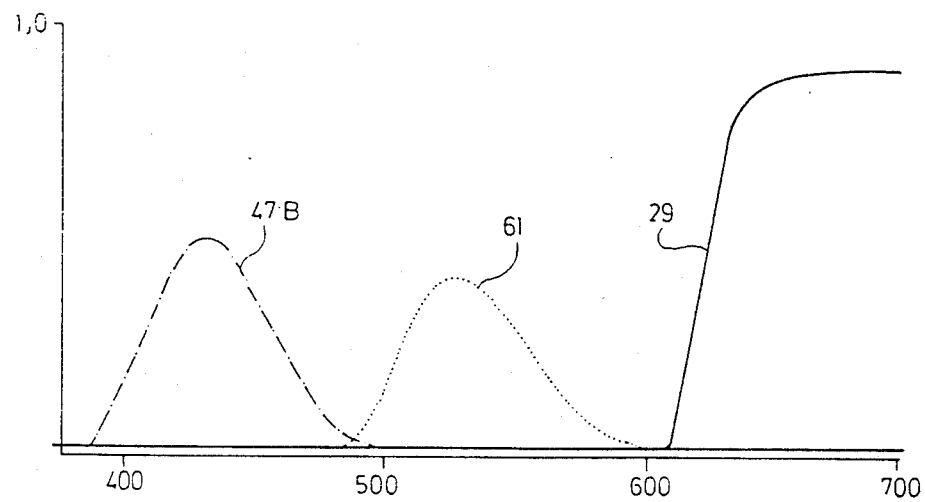
FIGS. 1a and 1b are plot diagrams showing spectral sensitivity curves for the system according to the invention, respectively, for a densitometric measurement and a colorimetric measurement.

Like parts in all of the figures are identified by the same reference characters.

Figure 1B:
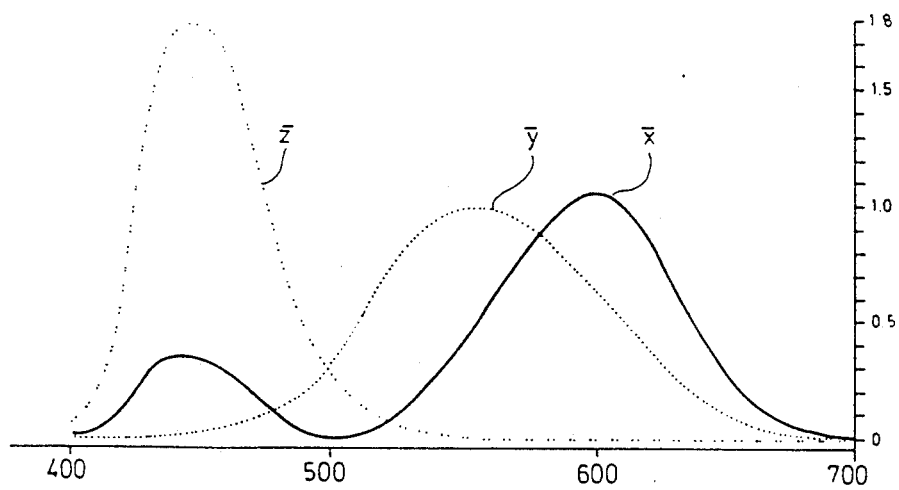

Referring now to the drawing and, first, particularly to FIG. 1a thereof, there are shown therein transmission curves required for densitometric measurement of the color filters for given printing inks M (magenta), C (cyan) and Y (yellow). In conventional measuring heads for densitometric measurement, the curves shown in FIG. 1a are obtained with appropriate filters. FIG. 1b represents the color-matching curves 2° X, Y and Z for the tristimulus process according to German Industrial Standards (DIN) 5033, Part 6, which may likewise be obtained with appropriate filters in a colorimetric measuring head.

Figure 2:
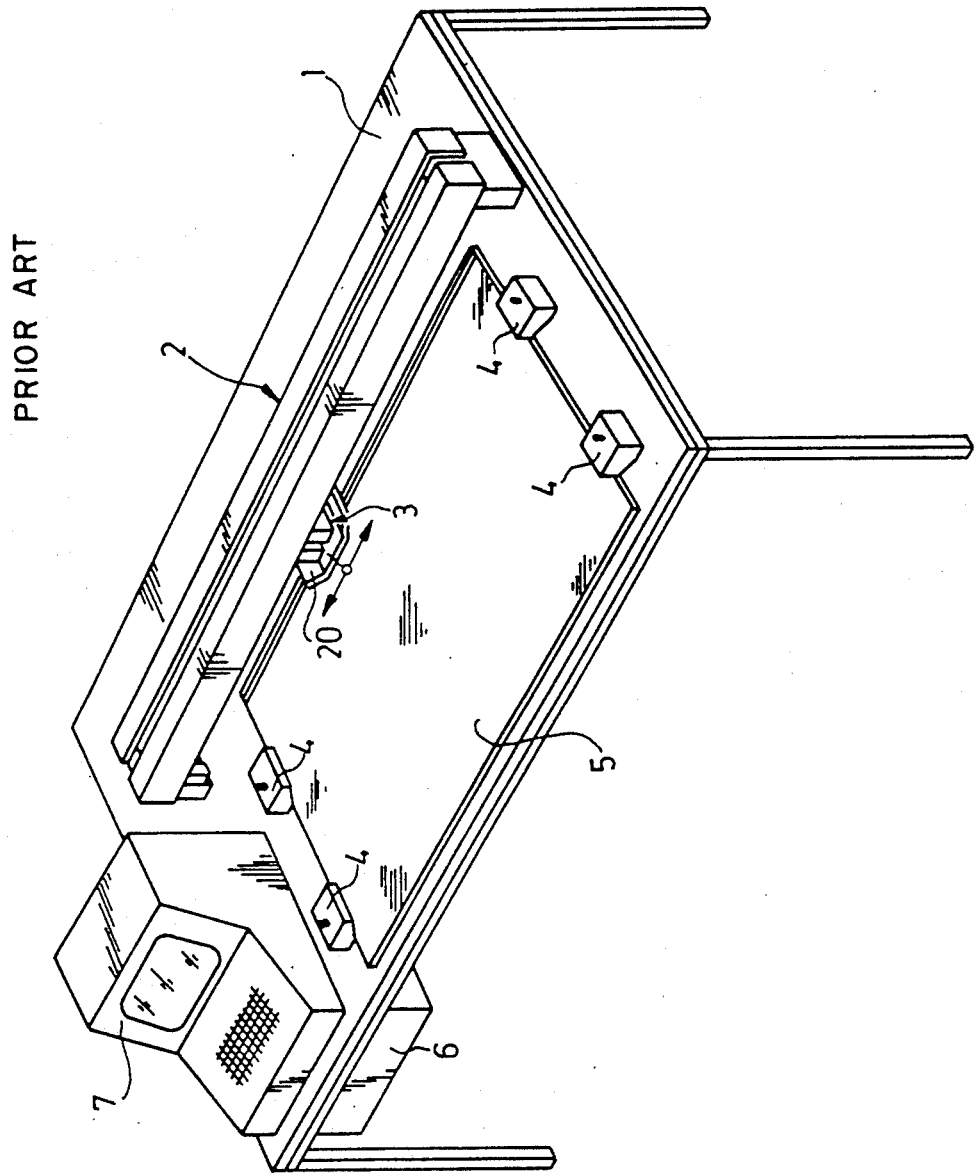
FIGS. 2 and 3 are respective full and fragmentary perspective views of a conventional system for evaluating a printed color-measuring or quality control strip, wherein the system is provided with a second measuring head.

The system illustrated in FIG. 2 encompasses a measuring table 1, a measuring bridge 2 with a measuring carriage 3 thereon, four clamping blocks 4 for securing a printed sheet 5 to be measured, an electronics unit 6 and a personal computer 7. The top of the table 1 is formed of a layer of sheet steel beneath an uppermost surface layer and permits the printed sheet 5 to be secured by means of magnets or the like. The personal computer 7 has an integrated screen terminal and is rotatably mounted on the table 1. The measuring carriage 3, the electronics unit 6 and the personal computer 7 are connected via non-illustrated lines.

The electronics unit 6 contains a microprocessor system and interfaces for processing measuring- and control signals fed thereto and generated thereby. The microprocessor system in the electronics unit 6 cooperates with the personal computer 7 in a so-called master-slave mode, the personal computer 7 performing a monitoring or control function and evaluating the measured and inputted data, while the system in the electronics unit 6 is responsible for performing the measurements and the movements of the measuring carriage.

Figure 3:
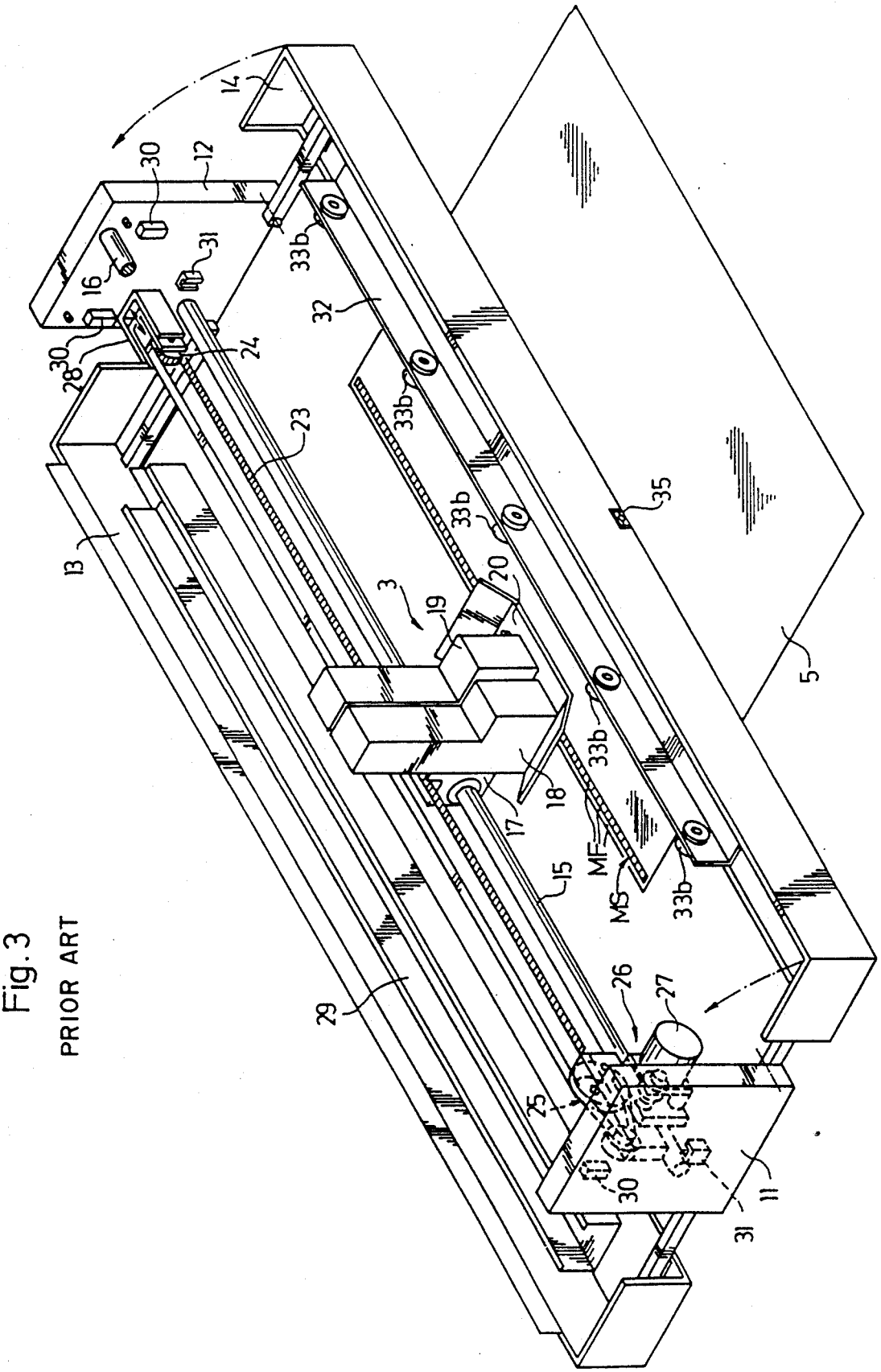

FIG. 3 is an enlarged fragmentary view of the measuring bridge 2 also shown in FIG. 1. The measuring bridge 2 is formed with two vertical side parts 11 and 12, which support the remaining parts of the bridge 2, as well as two outer casings or hood-like covers 13 and 14, which extend over the space between the two side parts 11 and 12 and are swivel-mounted on the latter so that they may be hinged or flapped apart into the positions illustrated in FIG. 3, thereby providing access to the inner parts of the measuring bridge 2. The two side parts 11 and 12 are connected to each other by a guide shaft 15 and by a connecting rod 16 shown only in part.

The measuring carriage, identified as a whole by reference numeral 3, is reciprocatingly movable on and may also be swivelled about the guide shaft 15. The measuring carriage 3 is formed of a guide block 17 provided with two ball boxes, two measuring heads 18 and 19 fixed to the guide block 17, as well a guide or hold-down plate 20, upwardly angled at both sides thereof. The measuring carriage 3 is provided with non-illustrated rollers at the underside thereof. During operation, the measuring carriage 3 rests on the printed sheet 5 which is to be measured, with the result that the distance between the measuring heads 18 and 19 and the individual fields MF of the measuring or quality control strip MS on the printed sheet 5 is always constant. The measuring head 18 is a colorimetric-purity measuring head with, for example, the spectral sensitivity curves illustrated in FIG. 1a. The measuring head 19 is constructed for colorimetric measurement according to FIG. 1b.

The measuring carriage 3 is driven by a toothed belt 23, which is passed over two rollers 24 and 25, each rotatably supported on one of the side parts 11 and 12, and has a lower or return run to which the guide block 17 is fixed. The roller 25 on the left-hand side of FIG. 3 is driven by a stepping motor 27 via a toothed-belt reduction-gear or step-down transmission unit 26 shown only in broken lines. The other roller 24 is supported in a freely rotatable manner in a clamping device 28. The stepping motor 27 and the transmission unit 26 are constructed so that the toothed belt 23 and the measuring carriage 3 therewith are moved forward at a rate of 0.1 mm per complete motor step.

A guide section 29 is disposed in the rear outer casing 13 and has a flat conductor running therethrough which electrically connects the measuring carriage 3 to the electronics unit 6 (FIG. 2). Further disposed at the side parts 11 and 12 are quick-release locks (indicated by blocks 30) for fixing the two outer casings or hoods 13 and 14 in their hinged-up or flapped-together closed positions, as well as a fork-type light barrier 31, which cooperates with a non-illustrated sheet-metal strip or the like on the guide block 17 and the measuring carriage 3, respectively, in such a manner that the measuring carriage 3 is automatically halted if it comes within a defined minimum distance from one or the other of the side parts e.g. due to a control error.

Fixed in the front outer casing or hood 14 is a holder 32 having an U-shaped cross section in which are disposed five marking lamps which are evenly distributed along the length of the measuring bridge (2). These lamps are respectively formed of a light source in the form of a so-called graduated or markers lamp (not visible in FIG. 3) in an upper leg of the holder 32 and of a projection lens system 33 in a lower leg of the holder 32, and form on the printed sheet 5 five bars of marking light approximately 20 mm in length, respectively, and arranged in a line. The bars of light serve for the alignment of the printed sheet 5 in such a manner that the measuring or quality control strip MS is caused to lie precisely below the travel path of the two measuring heads 18 and 19.

On the upper side of the front casing or hood 14, there is also provided an operating rocker or control bell crank 35 by means of which the measuring carriage 3 may be moved under manual control along the measuring or quality control strip MS into the desired measuring position.

Figure 4:
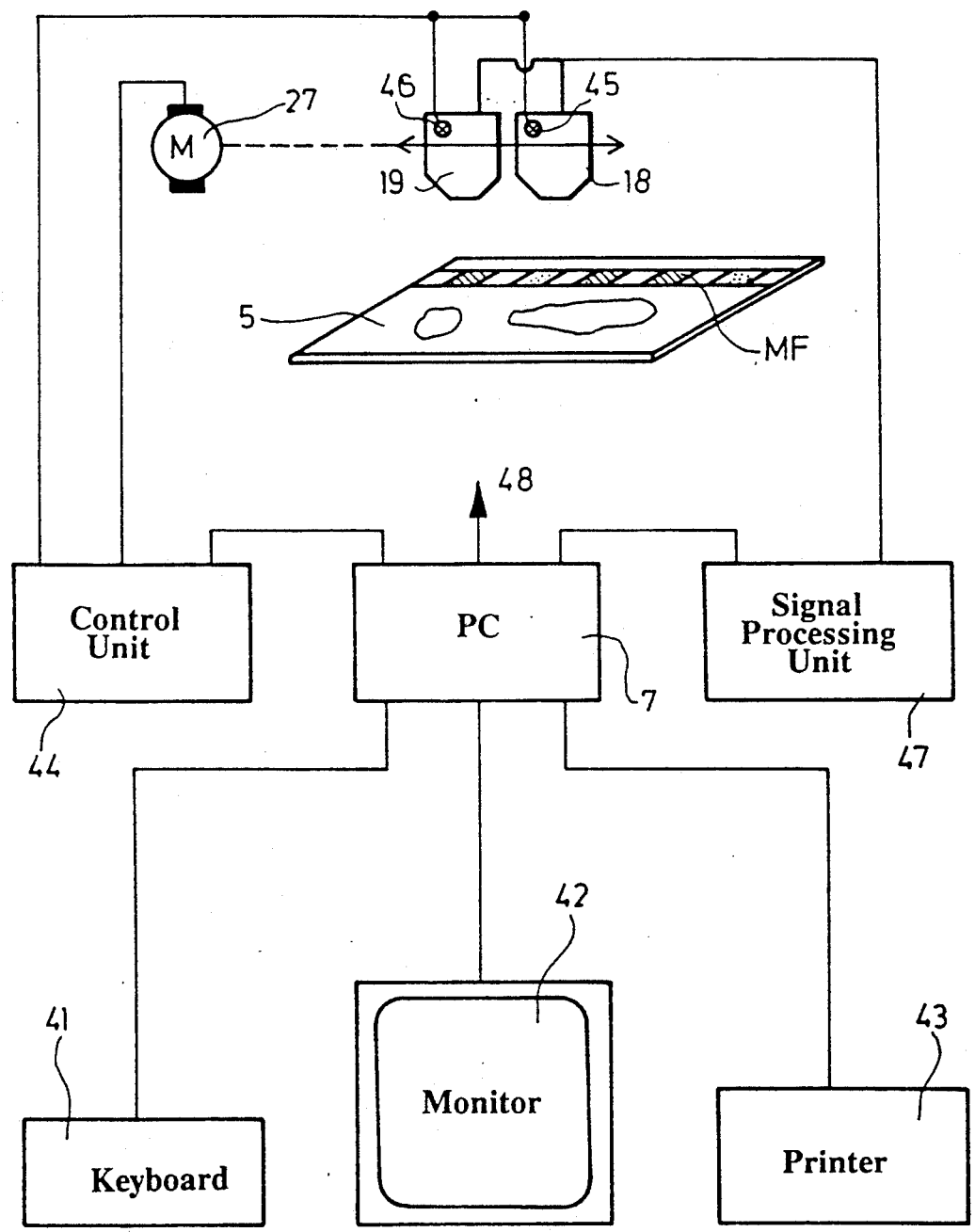
FIG. 4 is a diagrammatic and schematic view of an embodiment of the system according to the invention.

The block diagram in FIG. 4 shows an embodiment of the invention in which the measuring heads 18 and 19 are jointly movable by the stepping motor 27. As has been mentioned hereinbefore in connection with FIG. 2, the entire process of measuring and measured-value acquisition or recording is controlled by a personal computer 7. For this purpose, the personal computer 7 is connected, in a conventional manner, to a keyboard 41, a monitor 42 and a printer 43. Furthermore, an output of the personal computer 7 is connected to a control unit 44, which controls the stepping motor 27 and energizes lamps 45 and 46, respectively, contained in the measuring heads 18 and 19.

The output signals of the measuring heads 18 and 19 are fed to a signal processing device 47. The purity values and/or tristimulus values thus obtained are fed to the personal computer 7 for further processing. At the output 48 of the personal computer 7, control data are then available for a non-illustrated printing machine.

Figure 5:
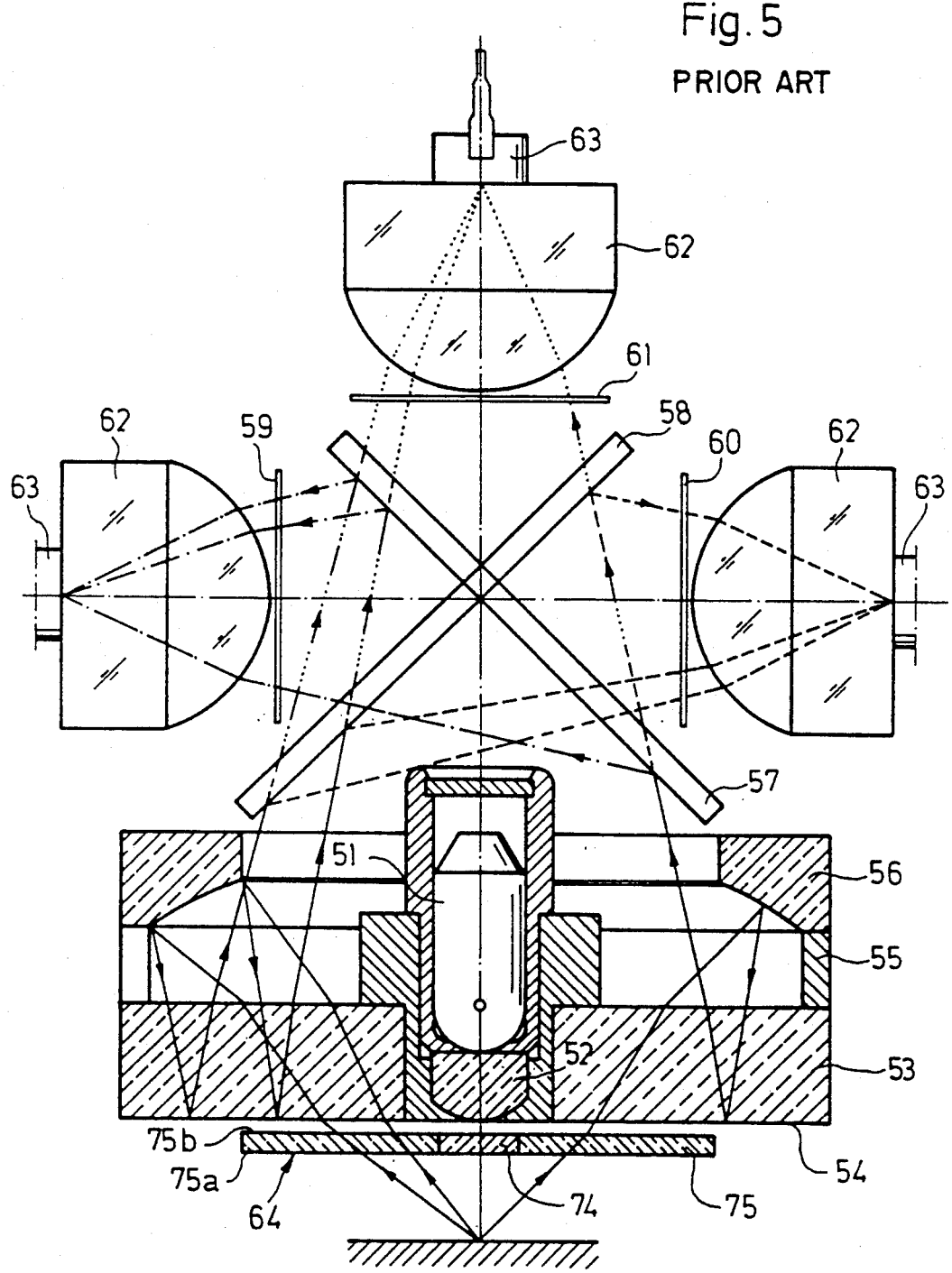
FIG. 5 is a conventional embodiment of a three-color simultaneous measuring head for densitometric measurement.

FIG. 5 represents a measuring head known heretofore from Published Non-Prosecuted European Patent Application 0 065 484, for densitometric measurement, the measuring head being advantageously suitable for the system and device according to the invention. Light emitted from a lamp 51 strikes an object being measured at 90°. The light reflected from the object is collected at 45° by means of a ring mirror lens system 53 to 56 and is split by means of two color-selective interference mirrors 57 and 58 into the three color components blue, red and green. The three color components are then passed via further filters 59 to 61 and separate aplanatic lenses 62 to separate silicon planar photodiodes 63. Two crossed linear polarizers 74a and 75a are introduced into the optical path to block the light that is directly reflected from the surface of the object being measured In order to prevent difficulties with the interference mirrors 57 and 58, which are sensitive to the direction of polarization of the light which impinges thereon, the linear polarizer 75a located in the path of the image rays is coated on the rear side thereof with a lambda/4 layer 75b, which effects a circular polarization of the light supplied to the mirror 57 and 58.

Figure 6:
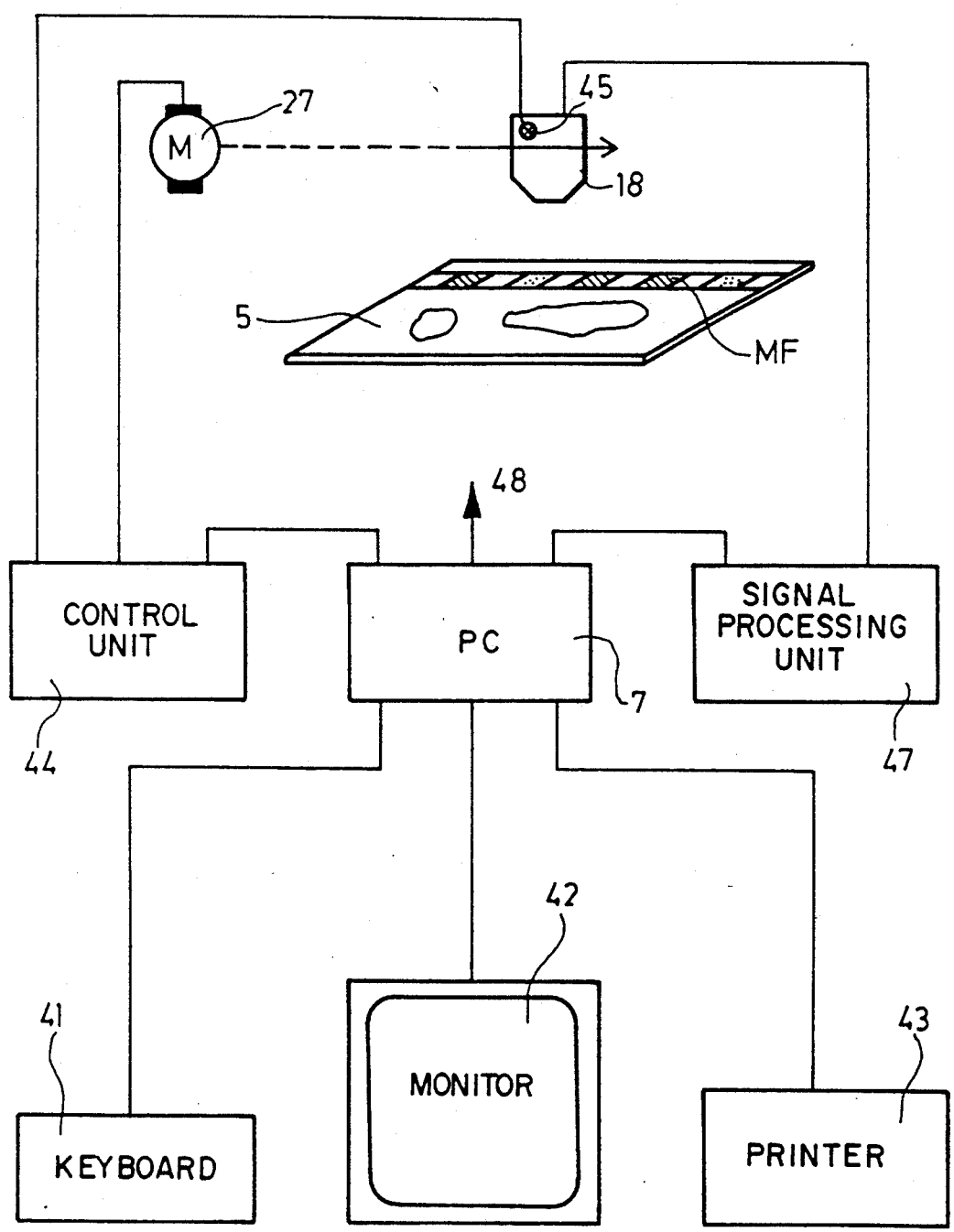
FIG. 6 is a view like that of FIG. 4 of another embodiment of the system according to the invention.

The block diagram in FIG. 6 shows a different embodiment of the invention which is similar to that of FIG. 4 except that, instead of two measuring heads, only one simultaneous measuring head 18' with six optoelectric receivers and six color filters, three for densitometric and three for colorimetric measurement, is provided.

The foregoing is a description corresponding in substance to German Application P 38 30 731.6, dated Sep.

9, 1988, the International priority of which is being claimed for the instant application, and which is hereby made part of this application. Any material discrepancies between the foregoing specification and the aforementioned corresponding German application are to be resolved in favor of the latter.

What is claimed is:

1. Color measurement system for offset printing, having a bridge for spanning an original which is to be measured and a color-measuring device movably disposed on the bridge, the color-measuring device comprising a first three-color simultaneous measuring head for densitometric measurement, and a second three-color simultaneous measuring head for colorimetric measurement.

2. Color measurement system for offset printing having a bridge for spanning an original which is to be measured, and a color-measuring device movably disposed on the bridge, the color-measuring device comprising a simultaneous measuring head with six optoelectric receivers, and three color filters for densitometric measurement and three color filters for colorimetric measurement, all of said filters, respectively, being disposed in optical paths of said six optoelectric receivers.

* * * * *